United States Patent
Kamalakantha et al.

(10) Patent No.: US 10,282,171 B2
(45) Date of Patent: May 7, 2019

(54) APPLICATION ANALYZER FOR CLOUD COMPUTING

(71) Applicant: HEWLETT PACKARD ENTERPRISE DEVELOPMENT LP, Houston, TX (US)

(72) Inventors: Chandra Kamalakantha, Plano, TX (US); Parag Doshi, Alpharetta, GA (US); Reinier Aerdts, Plano, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 114 days.

(21) Appl. No.: 15/506,400

(22) PCT Filed: Mar. 30, 2015

(86) PCT No.: PCT/US2015/023276
§ 371 (c)(1),
(2) Date: Feb. 24, 2017

(87) PCT Pub. No.: WO2016/159949
PCT Pub. Date: Oct. 6, 2016

(65) Prior Publication Data
US 2018/0225095 A1 Aug. 9, 2018

(51) Int. Cl.
*G06F 9/44* (2018.01)
*G06F 8/10* (2018.01)
(Continued)

(52) U.S. Cl.
CPC .............. *G06F 8/10* (2013.01); *G06F 8/60* (2013.01); *G06F 8/63* (2013.01); *G06F 9/45533* (2013.01);
(Continued)

(58) Field of Classification Search
CPC ........................................... G06F 8/10
(Continued)

(56) References Cited

U.S. PATENT DOCUMENTS 7,966,814 B2 * 6/2011 Buis .................. F02B 37/24
60/602
8,621,069 B1 12/2013 Tompkins
(Continued)

OTHER PUBLICATIONS

International Search Report & Written Opinion received in PCT Application No. PCT/US2015/023276, dated Dec. 17, 2015, 9 pages.
(Continued)

*Primary Examiner* — Evral E Bodden
(74) *Attorney, Agent, or Firm* — Brooks, Cameron & Huebsch, PLLC (57) ABSTRACT

A system includes a policy manger that includes a policy to describe policy attributes of an application that define whether the application can be deployed as a container server or as a non-container server. An application analyzer analyzes a given application with respect to the policy attributes to classify the given application as a container model or a non-container model. A deployment controller generates a corresponding container server for the given application if the given application is classified as a container model or generates a corresponding non-container server for the given application if the given application is classified as a non-container model.

15 Claims, 6 Drawing Sheets

(51) Int. Cl.
*G06F 15/16* (2006.01)
*G06F 8/61* (2018.01)
*G06F 9/455* (2018.01)
*G06F 8/60* (2018.01)
*G06F 9/54* (2006.01)

(52) U.S. Cl.
CPC .............. *G06F 9/547* (2013.01); *G06F 15/16* (2013.01); *G06F 2009/4557* (2013.01); *G06F 2009/45562* (2013.01); *G06F 2009/45595* (2013.01)

(58) Field of Classification Search
USPC ......................................................... 717/104
See application file for complete search history.

(56) References Cited

U.S. PATENT DOCUMENTS

| | | | |
|---|---|---|---|
| 8,918,448 | B2 | 12/2014 | DeLuca et al. |
| 9,122,562 | B1* | 9/2015 | Stickle ................. G06F 8/71 |
| 9,465,590 | B2* | 10/2016 | Ivanov ................. G06F 8/34 |
| 2003/0187946 | A1 | 10/2003 | Cable |
| 2005/0267856 | A1 | 12/2005 | Woollen |
| 2007/0198973 | A1 | 8/2007 | Choi et al. |
| 2010/0257527 | A1 | 10/2010 | Dvir et al. |
| 2011/0088011 | A1 | 4/2011 | Ouali |
| 2011/0213875 | A1 | 9/2011 | Ferris et al. |
| 2014/0047439 | A1 | 2/2014 | Levy et al. |
| 2016/0274928 | A1* | 9/2016 | Linton ................. G06F 9/45558 |

OTHER PUBLICATIONS

Kavimandan A. et al., "A Model-transformation Approach to Improving the Quality of Software Architectures for Distributed Real-time and Embedded Systems," (Research Paper), Feb. 20, 2009, 16 pages, available at http://www.dre.vanderbilt.edu/~gokhale/papers/optimization/optimization.pdf.

Schmidt D. et al., "Applying Optimization Principle Patterns to Component Deployment and Configuration Tools", Feb. 26, 2015, www.aosabook.org, 20 pages.

* cited by examiner

APPLICATION ANALYZER FOR CLOUD COMPUTING

BACKGROUND

System-level software virtualization is commonly employed in virtual hosting environments, where it is useful for securely allocating finite hardware resources amongst a large number of users and their respective applications. System administrators may also use virtualization, to a lesser extent, for consolidating server hardware by moving services on separate hosts into software entities referred to as containers, for example. In general, system-level software virtualization provides a method where the kernel of an operating system allows for multiple isolated user space instances, instead of just one. Such instances such as containers, virtualization engines (VE), or virtual private servers (VPS), for example, may operate like a monolithic server from the point of view of its owners and users yet at the same time is virtualized to a much smaller server footprint via available container technologies.

DETAILED DESCRIPTION

This disclosure relates to an application analyzer that operates in conjunction with a deployment controller to facilitate deployment and lifecycle management for container-based or non-container based servers in a cloud computing environment. Containers allow system designers to scale many applications into smaller computing footprints which can save on operating system costs. In some existing systems, moving a given application to a container may be a time-consuming task requiring significant expertise that is typically not available to frontline information technology designers. The systems and methods disclosed herein provide a policy framework where a given application can be automatically analyzed with respect to one or more policies for its respective suitability (or non-suitability) to be implemented as a container.

As an example, a system includes a policy manager that includes a policy (or policies) to describe policy attributes of an application that define whether the application can be deployed as a container server or as a non-container server, for example. The application analyzer analyzes a given application with respect to the policy attributes to classify the given application (e.g., container, non-container, type of container, and so forth). Policy attributes can be globally or narrowly specified to characterize the attributes of an application with respect to its suitability to be containerized. For instance, a given application can be classified as fitting to a container model or a non-container model based on an analysis of the policy attributes with respect to analyzed application attributes of the given application. The container model further can include container parameters for the given application based on the analysis.

A deployment controller generates a corresponding container server for the given application if the given application is classified as a container model. The container server that is generated further can be established according to the container parameters determined by the application analyzer and provided with the model. In an example that the given application is determined (e.g., by application analyzer) unsuitable for containers, the deployment controller generates a corresponding non-container server for the given application based on the non-container model generated for the given application.

Automated learning can be utilized to update the policies in the policy manager as new applications are developed and deployed. A lifecycle manager can also be provided with the deployment controller to manage the lifecycle of the deployed container or non-container servers, where lifecycle can include application installation/de-installation, upgrading, scaling up or down, enhancing security, monitoring, metering, and so forth.

Figure 1:
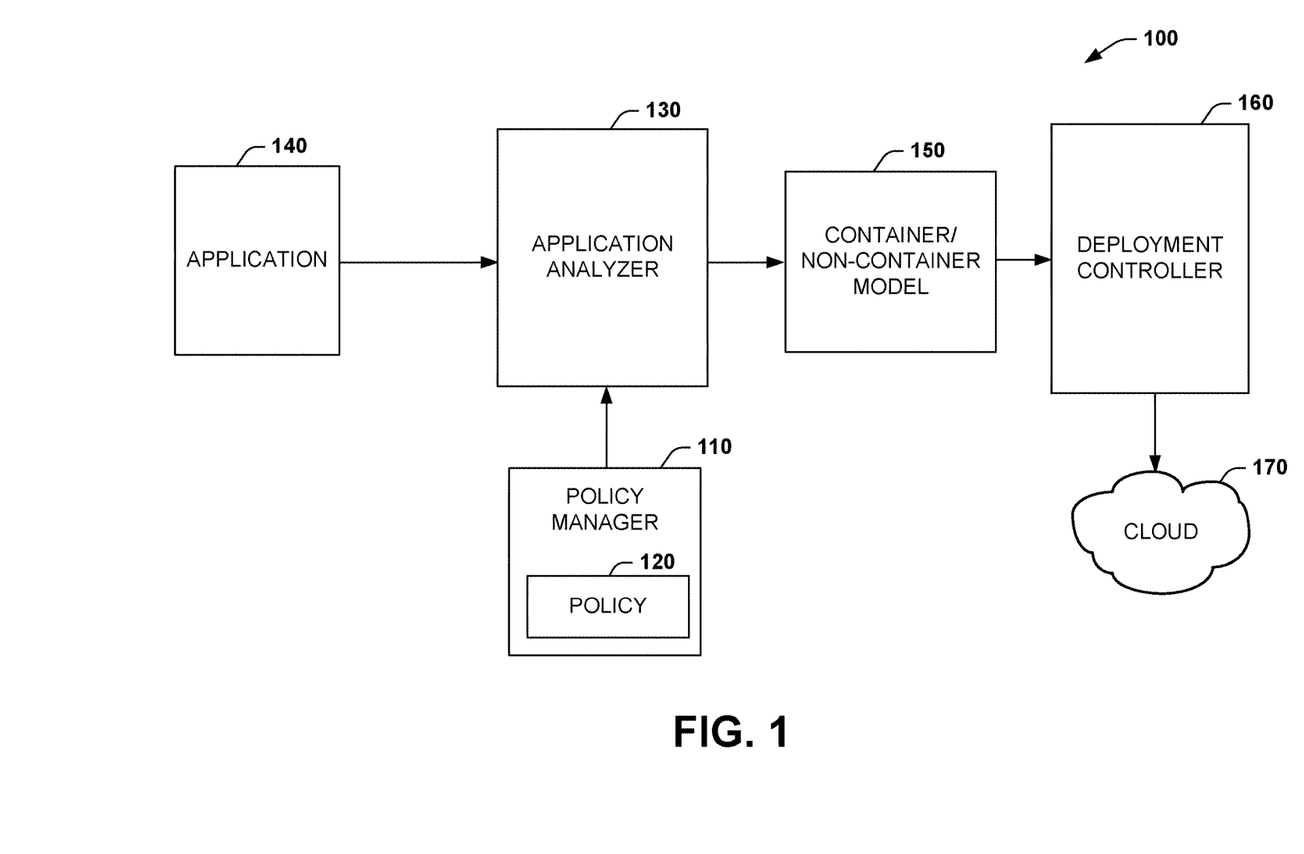
FIG. 1 illustrates an example of a system to automatically generate container or non-container servers for a cloud computing environment.

FIG. 1 illustrates an example of a system 100 to automatically generate container or non-container servers for a cloud computing system 170. As used herein, "cloud computing," "computing cloud" and variants thereof refer to any of a variety of computing applications that can be accessed, implemented, or consumed on or across a cloud computing environment, such as the cloud computing system 170. For example, the cloud computing system 170 can include storage, computing, and network resources and capabilities that are that can be available as services along with other cloud services, such as platform services and applications. The cloud computing system 170 can be hosted on a network, such as a public network (e.g., the Internet), a private network, a managed network environment, or a combination of different network types. Moreover, in the examples disclosed, the memory resource and the processing resource could be stored a single machine (e.g., a computer) or distributed across multiple computers (via a network).

The system 100 includes a policy manger 110 that includes a policy 120 (or policies) to describe policy attributes of an application that define whether the application can be deployed as a container server or as a non-container server, for example. An application analyzer 130 analyzes a given application 140 with respect to the policy attributes enumerated in the policy 120 to classify the given application. Example classifications can include classifying the given application 140 as suitable for a container, not suitable for a container, or a specific type of container may be classified to facilitate application and/or container performance. As used herein, the term container refers to a self-contained application that includes substantially all components for application execution within the container and runs independently of operating system type. This is in contrast to a virtual machine or physical server referred to as non-containers that are highly operating system dependent and are installed with the necessary interfaces to interact with the resident operating system.

Output from the application analyzer 130 includes a model 150. In one example, the model 150 denotes whether or not the application 140 can be containerized and/or what specific type of container (or non-container, such as a virtual machine) to employ. Container type examples can include containers provided by Docker, Origin (Open Shift), and Cloud Foundry, for example. The model 150 is supplied to a deployment controller 160 which then generates the type of server specified in the model and deploys the server to a computing cloud 170 which can include one or more computers that support the cloud.

Policy attributes for the policy 120 can be globally or narrowly specified to characterize the attributes of an application with respect to its suitability to be containerized. With respect to the policy 120 and related attributes, the application 140 and its basic attributes can include for example, application runtime stack (e.g., app server, database server, cache server), followed by runtime requirements (e.g., RAM, disk, and so forth), service level requirements, environment requirements (development, test, pre-production, and so forth). The analyzer 130 thus can determine these and other related attributes and provide a model for subsequent use by the deployment controller 160 (See e.g., model specifier and generator in FIG. 2). An example global policy may be specified as "All applications below a given service level requirement (e.g., threshold specifying number of web pages server per minute) can be containerized." An example of a more narrow policy may be stated as "Any application from this vendor cannot be containerized." An example of a tenant-based policy may be specified as "All applications submitted from Tenant A are to be placed in a container, unless infeasible." An example of a tenant-based policy may be specified as "All Applications for tenant B are to be run on a virtual server or physical machine."

By way of further example, the application analyzer 130 can classify a given application 140 as fitting to a container model or a non-container model based on an analysis of the policy attributes with respect to analyzed application attributes of the given application 140. In some cases, only a single attribute may be analyzed by the application analyzer 130 and in other cases multiple attributes may be analyzed including application type, service level performance, tenant preferences, application suitability/unsuitability, deployment considerations, legal restrictions, and so forth. If the application 140 is determined to be suitable for a container, the application analyzer 130 constructs the model 150, which the deployment controller 160 then employs to generate a corresponding container server for the given application and distributes and manages it with respect to the cloud 170.

If the given application 140 is not suitable for containers based on the model 150 specification, the deployment controller 160 generates a corresponding non-container server for the given application based on the non-container model 150 generated for the given application. Automated learning can be provided (See e.g., FIG. 2) to update the policies 120 in the policy manager 110 as new applications are developed and deployed. Policies can also be updated manually as system conditions change (e.g., customer preferences, service level agreements, billing matters, and so forth). A lifecycle manager (See e.g., FIG. 2) can also be provided with the deployment controller 160 to manage the lifecycle of the deployed container or non-container servers. For instance, lifecycle for deployed server can include application installation/de-installation, upgrading, scaling up or down, enhancing security, monitoring, metering, and so forth.

In general, container technologies have become more popular in the last few years, where containers allow code, applications, and other runtime components to be packaged in highly portable packages. Containers do not depend on whether they are hosted on physical or virtual machines nor the type of operating systems required. The fundamental distinction between non-container vs. container-based technology stacks is that non-container based solutions rely on intensive operating system support, for example. As a result, solutions employing containers experience a tremendous reduction in resource footprints thus allowing for hundreds and in some cases thousands of containers on a single physical server and reducing cost of ownership since more applications can be run using less hardware.

Figure 3:
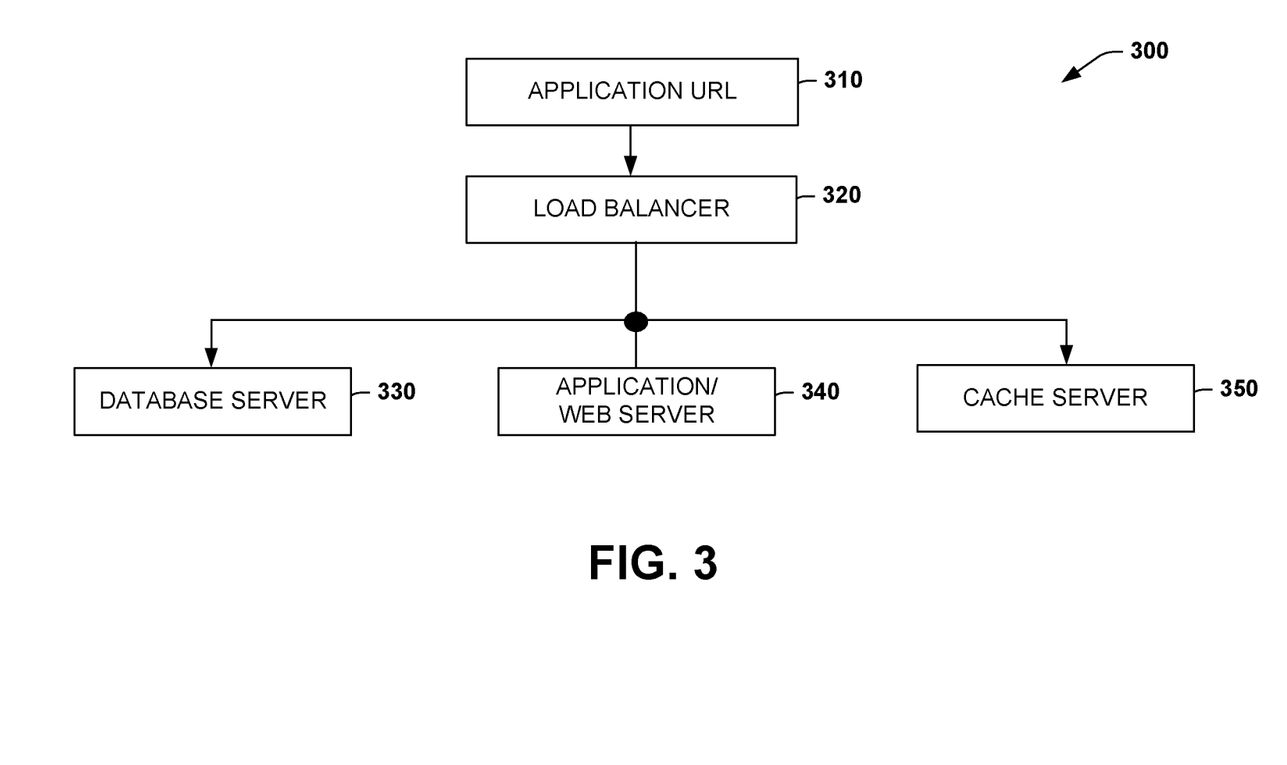
FIG. 3 illustrates an example of an application model that can be employed with a system to generate container or non-container servers for a cloud computing environment.

In one example, the application 140 and it is characteristics (also referred to as application attributes) can be captured initially as a model (e.g., unified modeling language, See e.g., FIG. 3). This captured model is then processed by the application analyzer 130 to determine the application fit to be hosted in container versus non-container technologies where model output is then generated at 150 specifying whether or not a container has been selected or what type of container, or what type of non-container technology should be employed such as a virtual machine or physical machine specification. Based on the application classification, the application analyzer 130 analyzes container choices versus non-container based technology differences. For example, differences exist with image management, network management, key management, and so forth that can influence the selection of a given container or non-container technology. As noted above, example containers can include Docker, Origin (OpenShift), Cloud Foundry, and so forth. The system 100 can operate in accordance with container cluster management software or individual containers can be supported depending on providers that are registered within the deployment controller 160, for example.

Figure 2:
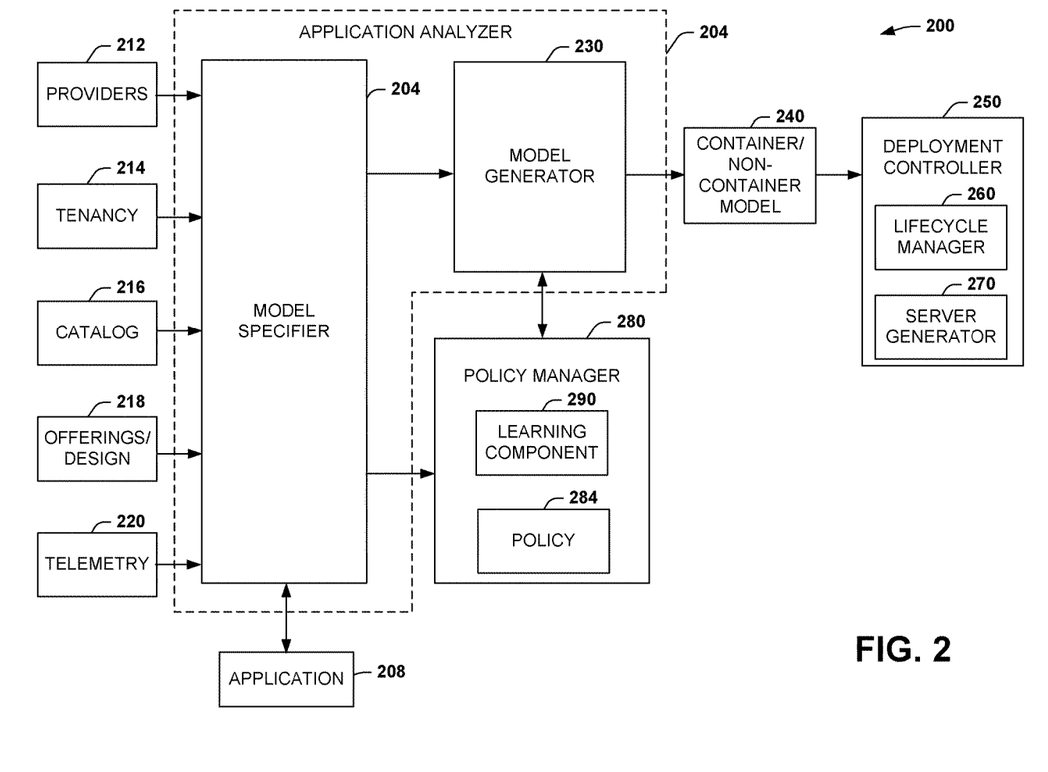
FIG. 2 illustrates an example of a system to automatically generate and manage container or non-container servers in a cloud computing environment.
Figure 4:
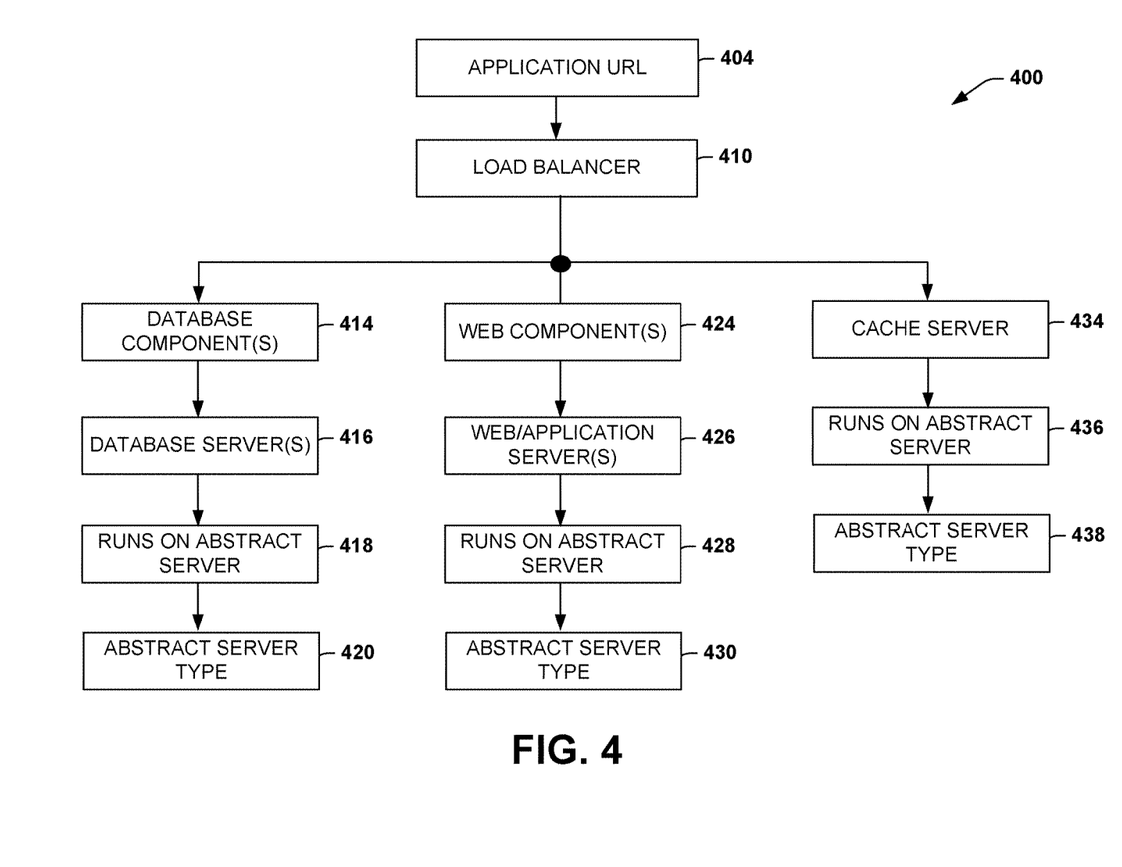
FIG. 4 illustrates an example of an output model that can be generated from the application model depicted in FIG. 3.

FIG. 2 illustrates an example of a system 200 to automatically generate and manage container or non-container servers in a cloud computing environment. The system 200 includes an application analyzer 202 having a model specifier 204 (e.g., graphical user interface and model processing machine readable instructions) which is employed to define policy attributes for a given application 208. Inputs to the model specifier 204 can include provider data 212, tenancy data 214, catalog data 216, offerings and design data 218, and telemetry data 220 which are described in more detail below. Output from the model specifier 204 (See e.g., application model diagram FIG. 3) is provided to a model generator 230 which generates an output model 240 indicating whether a container has been selected and what type of sever to implement via a deployment controller 250. The deployment controller 250 includes a lifecycle manager 260 to manage to manage lifecycle issues with the deployed container or non-container server.

As noted previously, lifecycle management can include application installation/de-installation, upgrading, scaling up or down, enhancing security, monitoring, metering, and so forth. For example, application loading can be monitored via the installed container servers. If the load is more or less than when installed, additional servers and/or containers can be added or removed from service to support the determined load. Thus, containers (or non-container servers) can be scaled up or down based on dynamic conditions detected in the computing cloud.

As shown, the deployment controller 250 can also include a server generator 270 which generates the code to create a corresponding server (e.g., a container server or a non-container server) based on the output model 240 that is provided by the model generator 230 of the application analyzer 202 for the given application 208. For example, if the model 240 specifies a container model for the given application, the server generator 270 can call functions in Docker software to instantiate a Docker container for the given application 208. In other examples where another type of container model is selected for the given application 208, the server generator 270 can call the respective software to generate that type of container. Also, if a non-container model 240 is generated for the given application, such as a virtual machine model 150, the server generator 270 can allocate resources and install the virtual machine (e.g., JAVA virtual machine).

Similar to FIG. 1 above, a policy manager 280 includes a policy 284 (or policies) that describe attributes of an application that are analyzed by the application analyzer 202 to determine container versus non-container fit of the given application 208. The policy 284 can receive updates from the model specifier 204 regarding changes with respect to the inputs 212-220. The policy 284 further can set rules employed to establish parameters for the model 240 that is being generated for the given application 208.

Additionally, the policy manager 280 can include a learning component 290 which can be employed to learn and determine which applications can be containerized and which cannot. For example, if a new application is analyzed and it is determined that it is a fit for a container, the policy 284 can automatically be updated via the learning component 290 that such application in the future is a suitable candidate for a container. The learning component 290 can include code programmed to implement substantially any type of artificial intelligence component, such as a classifier (e.g., support vector machine). A specific example for the learning component 290 includes utilization of a Resource Description Framework (RDF) component.

In one specific example, the system 200 and learning component 290 utilizes RDF and Web Ontology Language (OWL). The RDF has features that facilitate data merging even if the underlying schemas differ, and it specifically supports the evolution of schemas over time without requiring all the data consumers to be changed. The RDF extends the linking structure of the Web to use URIs to name the relationship between things as well as the two ends of the link (usually referred to as a "triple"). Using this model, it allows structured and semi-structured data to be mixed, exposed, and shared across different applications. This linking structure forms a directed, labeled graph, where the edges represent the named link between two resources, represented by the graph nodes. The learning component 290 builds the triples of application components that could be containerized based on prior experiences and extends the triples. One relationship example is that since User A is friend of User B, User B's friend User C is linked as a friend, using a Friend-of-Friend relationship between learning nodes. Similarly OWL transitive and reflexive properties create new triples to learn policies via the learning component 290.

As noted above, the model specifier 204 receives various inputs 212-220 that enable application models to be developed and policies attributes of the policy 284 to be defined. The provider data 212 provides the capability for the deployment engineer to describe the available deployment environments (e.g., available resources) along with credentials and API (application interface) end points to automatically create the server or container. The server could be a virtual machine or physical server with cluster support, for example. Tenancy data 214 allows multi-tenancy support. The tenancy data 214 thus allows for the deployment engineer to setup tenants and their related deployment environments, which can be set according service level agreements between each tenant and their subscribers.

Catalog data 216 leverages the application (See e.g., FIG. 4) followed by which clients can provision the application. In other words, application design, its related artifacts and offerings can be published as a higher level entity for tenants of a service provider to access and provision it. It also provides an interface to capture cost, how it is monitored or metered for providing both usage/consumption based billing and flat rate billing methods to instrument telemetry, for example. Based on the description of the higher level entity, costs involved, how monitoring or metering is to be achieved, the model specifier 202 can update the policy accordingly. For example, if an intensive level of monitoring is required to guarantee a given service level, it may not be possible to containerize the given application 208.

The service design and offering data 218 allows the deployment engineer to describe the application and its persona. The example of such capability is described in FIG. 4 that describes an application design which can be referred to as a service design. The service offering is an instance of the service design that is specific to a given tenant. In other words, the service design of a given application such as depicted in FIG. 4 is generic however, instance characteristics of it varies by tenant. For example, Vendor A may run the application depicted in FIG. 4 on containers because of policy constraints and Vendor B may run the application on physical servers, for example.

The telemetry data 220 supports various billing strategies for the system such as billing by consumption/usage, provisioning, business value pricing, and so forth. The telemetry data 220 can be implemented as an abstract interface (in object oriented terms) and supports multiple implementations for different billing strategies. For example it can support billing in the given application based on number of help desk tickets processed or flat rate billing which can influence whether or not the given application 208 can be containerized.

The policy manager 280 provides capability to describe/register the types of application that can be containerized by a tenant. For example, application or web servers such Apache, TomCat, and so forth are container aware however the applications that run on it may not be because of need of security. The policy manager 280 and policy 284 can automatically be enriched by self-learning by use of machine learning technology in the learning component 290 (e.g., Resource Description Framework—RDF).

The example model 400 depicted in FIG. 4 leverages the policy manager 280 to bind the appropriate application to a server (e.g., virtual machine, Physical Server, or Container) by using policies 284. In other words, actuation and generation of the servers via the server generator 270 can be invoked via provider APIs. For example, the server generator 270 uses a Docker API to create Docker container and VMware API to create a virtual machine on VMware or IPMI to create a new physical server that is registered under the providers at 212.

FIG. 3 illustrates an example of an application model 300 that can be employed by deployment controller (e.g., 160 or 250) to generate container or non-container servers for a cloud computing environment. The application model 300 represents but one of a plurality of differing configurations to support a given cloud computing service. In this example, the model for a web site application is described having an application URL 310 that provides access to a given web page. A load balancer 320 may be utilized to manage the load across various servers that may support the application model 300. The servers can include a database server 330, and application/web server 340, and/or a cache server 350. Each of the respective servers 330-350 can be implemented as a container or non-container technology depending on the underlying policy and automated analysis described herein. The model 300 can then be processed by an application analyzer and model generator described herein producing an example output such as depicted in FIG. 4.

FIG. 4 illustrates an example of an output model 400 that can be generated from the application model depicted in FIG. 3. The model 400 depicts that all of application components of FIG. 3 are first designated as an abstract server denoting that a unique server instantiation is required. The abstract server can then be dynamically loaded to providers as corresponding container or non-container servers at runtime using the runtime environment of the deployment controller, for example. The corresponding server can bind to the resource providers that are described by the model specifier described above. As shown, the model 400 includes an application URL 404 and load balancer node 410. A branch representing a database server includes one or more database components 414 (e.g., SQL components) and one or more database servers 416 which are initially bound to an abstract server 418.

At controller runtime, the deployment controller (e.g., 160 or 250) generates the server type based on a specification provided in an abstract server type at 420. The abstract server type 420 can specify a container, container type, virtual machine, or physical server, for example, and automatically determined via the policies and analytics described herein. Another branch of the model 400 supporting web server operations includes one or more web server components 424 supported by one or more web application servers 426 which are bound to an abstract server 428. Again, the server type for the abstract server 428 is specified at 430. A third branch of the diagram includes a cache server 434 that runs on abstract server 436 where its type is specified at 438.

Figure 5:
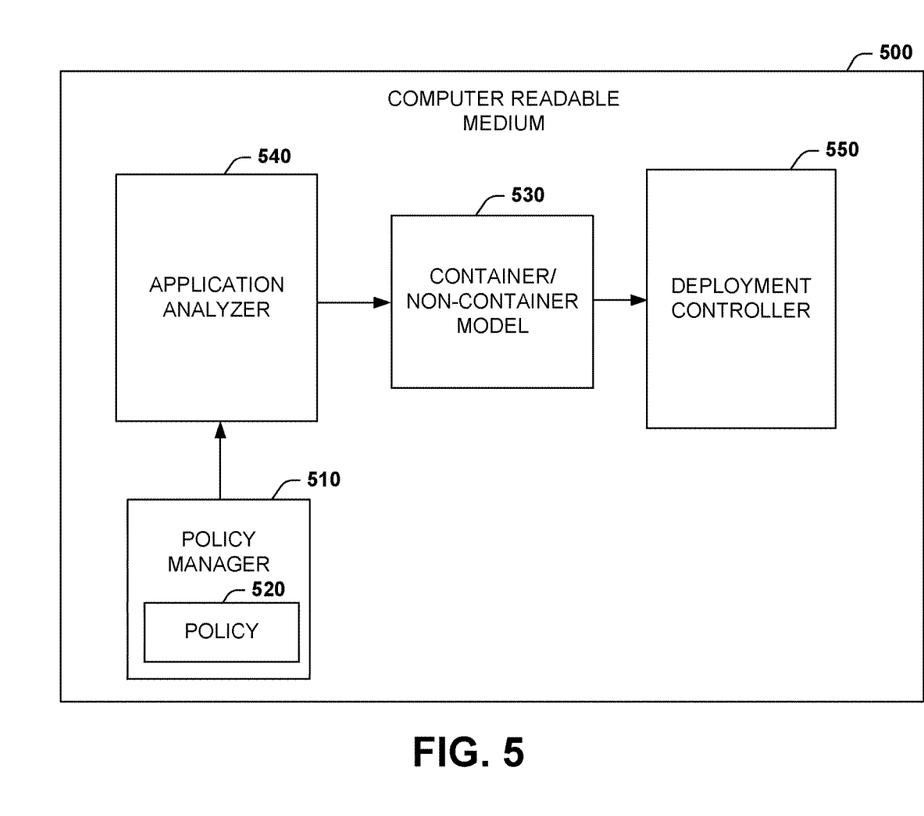
FIG. 5 illustrates an example of a computer readable medium having machine-readable instructions to automatically generate container or non-container servers for a cloud computing environment.

FIG. 5 illustrates an example of a computer readable medium 500 having machine-readable instructions to automatically generate container or non-container servers for a cloud computing environment. The instructions can be configured via the various functional blocks represented in the medium 500. These block include a policy manager 510 to specify a policy 520 to describe policy attributes of an application that define whether the application can be deployed as a container server or as a non-container server via model 530. An input analyzer block 540 analyzes a given application with respect to the policy attributes of the policy 520 to classify the given application as a container model or a non-container model. A deployment controller block 550 includes instructions to generate a corresponding container server for the given application if the given application is classified as a container model or generate a corresponding non-container server for the given application if the given application is classified as a non-container model. Although not shown, the medium 500 can also include instructions to support other functions described herein including lifecycle management and learning, for example.

Figure 6:
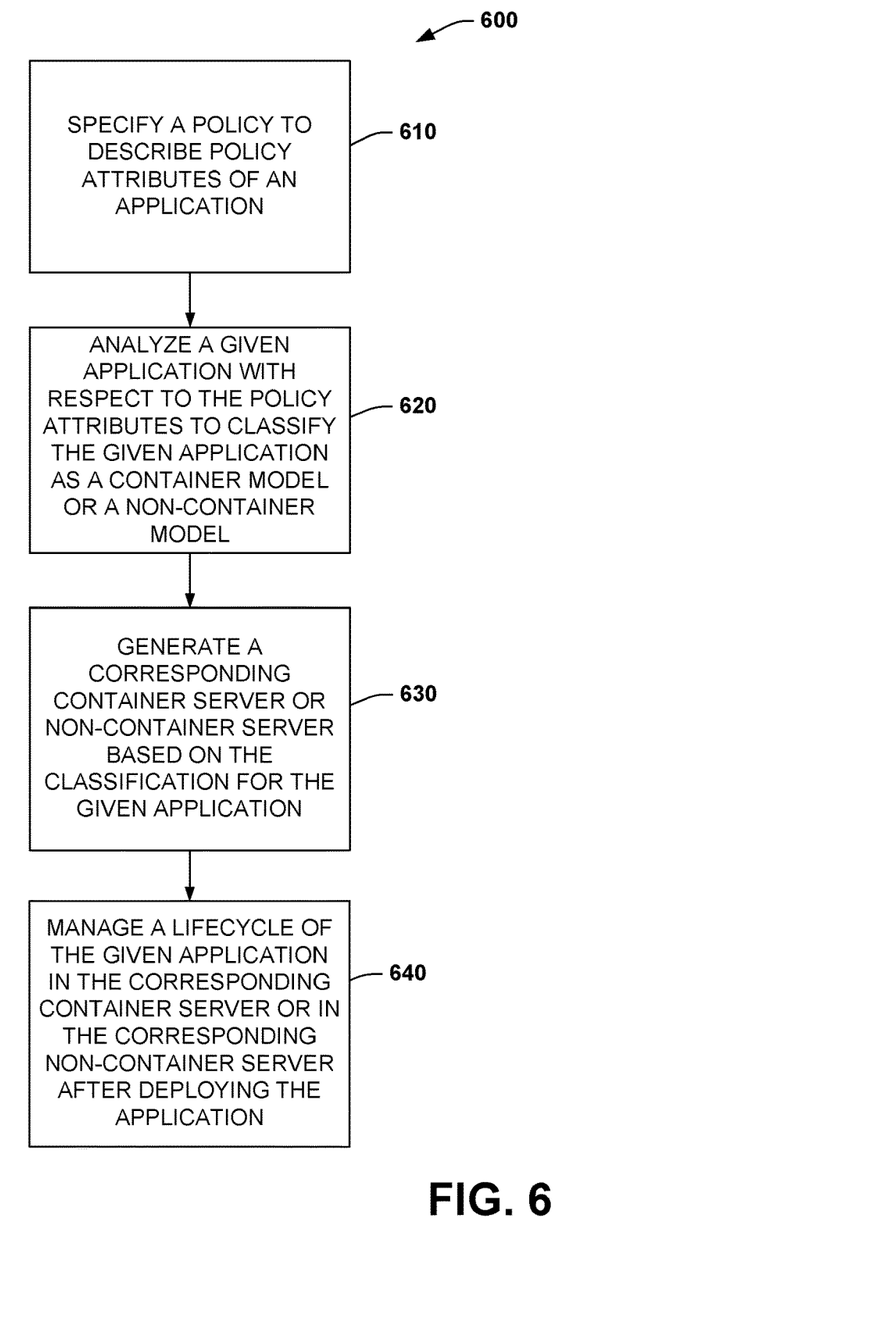
FIG. 6 illustrates an example of a method to automatically generate container or non-container servers for a cloud computing environment.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components and executed by an integrated circuit, computer, or a processor, for example.

FIG. 6 illustrates an example of a method 600 to automatically generate container or non-container servers for a cloud computing environment. At 610, the method 600 includes specifying a policy to describe policy attributes of an application that define whether the application can be deployed as a container server or as a non-container server (e.g., via policy manager 110 of FIG. 1). At 620, the method 600 includes analyzing a given application with respect to the policy attributes to classify the given application as a container model or a non-container model (e.g., via application analyzer 130 of FIG. 1). At 630, the method 600 includes generating a corresponding container server for the given application if the given application is classified as a container model or generating a corresponding non-container server for the given application if the given application is classified as a non-container model (e.g., via deployment controller 160 of FIG. 1). At 640, the method 600 includes managing a lifecycle of the given application in the corresponding container server or in the corresponding non-container server after deploying the application (e.g., via lifecycle manager 260 of FIG. 1).

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system, comprising:
a processor; and
a memory resource to store instructions executable by the processor to:
compare, prior to a deployment of a given application, descriptions of policy-attributes of applications that define whether the applications can be deployed as a container server or as a non-container server to a description of an attribute of the given application;
generate, prior to the deployment of a given application, a model to:
designate an abstract server for each component of a given application,
designate, based on the comparison, whether the abstract server for each component of the given application is a container server or a non-container server, and
designate, based on an analysis of technology differences between a plurality of container technologies, a specific type of a container technology from a plurality of container technologies to be utilized for the abstract server for each component of the given application if the abstract server is designated a container server and, based on an analysis of technology differences between a plurality of non-container technologies, a specific type of non-container technology from a plurality of non-container technologies to be utilized for the abstract server for each component of the given application if the abstract server is designated a non-container server; and generate, prior to the deployment of the given application, a corresponding server for each component of the given application according to the model.

2. The system of claim 1, wherein the analysis of the technology differences between the plurality of container technologies includes a selection of the specific container technology of the plurality of container technologies based on an image management characteristic, a network management characteristic, and a key management characteristic of the specific technology.

3. The system of claim 1, wherein the corresponding server for each component of the given application is generated based on an application programming interface (API) call to a service provider of containers, virtual machines, or physical servers.

4. The system of claim 1, further comprising instructions to detect whether a new application can be containerized as a description of an attribute of the new application is compared to the policy attributes and automatically update the policy attributes accordingly.

5. The system of claim 4, wherein a classifier or a resource description framework component is utilized to detect whether the new application can be containerized and update the police attributes.

6. The system of claim 1, further instructions to perform at least one of installing, de-installing, upgrading, scaling, security, monitoring, or metering of the corresponding server.

7. The system of claim 1, further comprising instructions to provide the given application as an input model to generate the model.

8. The system of claim 7, wherein the input model is specified as a unified modeling language (UML) model.

9. The system of claim 7, further comprising instructions to utilize input from provider data, tenant data, or catalog data to define the policy attributes.

10. The system of claim 7 further comprising instructions to input from offerings and design data or telemetry data to define the policy attributes.

11. A non-transitory computer readable medium having machine-readable instructions stored thereon, the machine readable instructions configured to:

specify a policy to describe policy attributes of an application that define whether the application can be deployed as a container server or as a non-container server;

analyze, prior to a deployment of a given application, the given application with respect to the policy attributes to classify the given application as a container model or a non-container model;

generate, prior to the deployment of the given application, a model to:

designate an abstract server for each component of a given application, designate, based on the classification given to the application, whether the abstract server for each component of the given application is a container server or a non-container server, and designate, based on a comparison of a plurality of container technologies, a specific type of a container technology from the plurality of container technologies to be utilized for the abstract server for each component of the given application if the abstract server is designated a container server and, based on a comparison of a plurality of non-container technologies, a specific type of non-container technology from the plurality of non-container technologies to be utilized for the abstract server for each component of the given application if the abstract server is designated a non-container server; and generate, prior to the deployment of the given application, a corresponding container server of the specific type of container technology designated by the model for the given application if the given application is classified as a container model or generate a corresponding non-container server of the specific type of non-container technology designated by the model for the given application if the given application is classified as a non-container model.

12. The non-transitory computer readable medium of claim 11, further comprising instructions to automatically update the policy as applications are analyzed.

13. The non-transitory computer readable medium of claim 11, further comprising instructions to perform installing, de-installing, upgrading, scaling, security, monitoring, or metering of the corresponding container or non-container server.

14. A method comprising:

specifying a policy to describe policy attributes of an application that define whether the application can be deployed as a container server or as a non-container server;

analyzing, prior to a deployment of a given application, the given application with respect to the policy attributes to classify the given application as a container model or a non-container model;

generating, prior to the deployment of the given application, a model to:

designate an abstract server for each component of a given application, designate, based on the classification given to the application, whether the abstract server for each component of the given application is a container server or a non-container server, and designate, based on a comparison of a plurality of container technologies, a specific type of a container technology from the plurality of container technologies to be utilized for the abstract server for each component of the given application if the abstract server is designated a container server and, based on a comparison of a plurality of non-container technologies, a specific type of non-container technology from the plurality of non-container technologies to be utilized for the abstract server for each component of the given application if the abstract server is designated a non-container server;

generating, prior to the deployment of the given application, a corresponding container server of the specific type of container technology designated by the model, via a controller, for the given application if the given application is classified as a container model or generating a corresponding non-container server of the specific type of container technology designated by the model for the given application if the given application is classified as a non-container model; and managing a lifecycle of the given application, via the controller, in the corresponding container server or in the corresponding non-container server after deploying the application.

15. The method of claim 14, further comprising learning the policy attributes over time when analyzing the given application to automatically update the policy.

* * * * *